United States Patent
Kim et al.

(10) Patent No.: US 9,372,356 B2
(45) Date of Patent: Jun. 21, 2016

(54) IMAGE DISPLAY DEVICE INCLUDING BARRIER CELL AND METHOD OF FABRICATING THE SAME

(71) Applicant: LG DISPLAY CO., LTD., Seoul (KR)

(72) Inventors: Kyung-Ki Kim, Gongju-si (KR); Jung-Min Choi, Gumi-si (KR); Ho-Jae Kim, Gyeongsan-si (KR)

(73) Assignee: LG Display Co., Ltd., Seoul (KR)

( * ) Notice: Subject to any disclaimer, the term of this patent is extended or adjusted under 35 U.S.C. 154(b) by 281 days.

(21) Appl. No.: 13/679,622

(22) Filed: Nov. 16, 2012

(65) Prior Publication Data

US 2013/0128161 A1 May 23, 2013

(30) Foreign Application Priority Data

Nov. 17, 2011 (KR) .................. 10-2011-0120284

(51) Int. Cl.
*G02F 1/1339* (2006.01)
*G02B 27/22* (2006.01)
*G02F 1/13* (2006.01)
*H04N 13/04* (2006.01)

(52) U.S. Cl.
CPC .......... *G02F 1/1313* (2013.01); *G02B 27/2214* (2013.01); *G02F 1/1303* (2013.01); *G02F 1/13394* (2013.01); *H04N 13/0409* (2013.01); *H04N 2213/001* (2013.01)

(58) Field of Classification Search
None
See application file for complete search history.

(56) References Cited

U.S. PATENT DOCUMENTS

| 7,245,343 B2* | 7/2007 | Suzuki et al. ................. 349/155 |
| 8,269,735 B2* | 9/2012 | Kim ........................ G06F 3/045 345/173 |
| 2007/0153215 A1* | 7/2007 | Lee ..................... G02F 1/13394 349/156 |
| 2007/0263162 A1* | 11/2007 | Kang .................. G02F 1/13394 349/155 |
| 2008/0002134 A1* | 1/2008 | Jeong ............................ 349/153 |
| 2009/0002267 A1* | 1/2009 | Nam et al. ........................ 345/6 |
| 2012/0013606 A1* | 1/2012 | Tsai et al. ..................... 345/419 |
| 2012/0044451 A1* | 2/2012 | Inoue ........................... 349/155 |
| 2012/0268671 A1* | 10/2012 | Inoue et al. ..................... 349/155 |

FOREIGN PATENT DOCUMENTS

| JP | 2005-258222 | * 9/2005 |
| JP | 2005-258222 A | 9/2005 |
| KR | 10-2008-0114310 A | 12/2008 |

* cited by examiner

*Primary Examiner* — Ryan Crockett
(74) *Attorney, Agent, or Firm* — Birch, Stewart, Kolasch & Birch, LLP

(57) ABSTRACT

There are provided an image display device including a barrier cell, and a method of fabricating the same. The image display device includes: a display panel configured to display an image; and a barrier cell configured to block or transmit an image emitted from the display panel, wherein a pattern spacer for maintaining a cell gap of the barrier cell is disposed in correspondence to a white area of the barrier cell, and the white area transmits the image emitted from the display panel.

9 Claims, 6 Drawing Sheets

IMAGE DISPLAY DEVICE INCLUDING BARRIER CELL AND METHOD OF FABRICATING THE SAME

The present application claims the priority benefit of Korean Patent Application No. 10-2011-0120284 filed in the Republic of Korea on Nov. 17, 2011, which is hereby incorporated by reference.

BACKGROUND

1. Field of the Disclosure

The present disclosure relates to an image display device including a barrier cell and a method of fabricating the same, and more particularly, to an image display device including a barrier cell, capable of preventing light leakage due to spacers by adjusting the arrangement of the spacers in the barrier cell, and a method of fabricating the image display device.

2. Discussion of the Related Art

Recently, with the development of information society, demands in the display field are increasing in various forms, and various image display devices capable of implementing 3-dimensional (3D) images as well as 2-dimensional (2D) images have been developed.

Human feels depth and cubic effect of images depending on various psychological and memory factors as well as binocular disparity due to the distance between the eyes.

A 3D image display method that provides cubic effects using the physiological factor of eyes is a stereoscopic type.

The stereoscopic type is based on stereography in which when 2D associated images including disparity information are provided to left and right eyes that are about 65 mm away from each other, the brain combines the 2D associated images to create spatial information before and after a display plane, thereby expressing the cubic effect.

The method of expressing cubic effects can be classified into a glasses-type method in which a user wears special glasses, and an autostereoscopic method using a lens array, such as a parallax barrier or lenticular, on a display plane, according to the location at which the cubic effect is substantially made.

In general, the autostereoscopic method is excellent in view of 3D brightness, compared to the glasses-type method.

A stereoscopic image display device includes a display panel that displays left-eye images and right-eye images, respectively, and a viewing zone generating unit that is disposed above or below the display panel. Lately, studies into the stereoscopic image display device are actively being conducted since it allows users to view 3D images without having to use any additional means.

The viewing zone generating unit may include a lens array, such as a parallex barrier, lenticular, etc.

Particularly, in the case of using a barrier cell, whether a liquid crystal layer functions as a barrier may be determined according to whether a voltage is applied.

An image display device including a barrier cell can select a 2-dimensional (2D) mode and a 3-dimensional (3D) mode.

Hereinafter, an image display device including a barrier cell will be described with reference to drawings.

FIGS. 1 and 2 are views for explaining the arrangement of spacers in a conventional barrier cell 20.

As illustrated in FIG. 1, the conventional barrier cell 20 includes third and fourth substrates 21 and 29 that are spaced apart from each other in a manner to face each other, and a second liquid crystal layer 26 formed between the third and fourth substrates 21 and 29.

A first protection layer 23 is formed on the third substrate 21, and a plurality of first electrodes PXL are formed at intervals on the first protection layer 23. A second protection layer 25 is formed on the first electrodes PXL, and a plurality of second electrodes Vcom are formed at intervals on the second protection layer 25.

Signal lines may be formed between the third substrate 21 and the first protection layer 23.

Each first electrode PXL may be formed in correspondence to the space between two neighboring second electrodes Vcom, and each second electrode Vcom may be formed in correspondence to the space between two neighboring first electrodes PXL.

In other words, the first electrodes PXL and the second electrodes Vcom may be alternately arranged.

A third electrode 27 is formed in the form of a film on the lower surface of the fourth substrate 29, and a second liquid crystal layer 26 is formed between the third and fourth substrate 21 and 29.

Also, black matrices BM may be formed between the fourth substrate 29 and the third electrode 27 to cover signal lines, etc.

The liquid crystal molecules of the second liquid crystal layer 26 may be aligned according to an electric field that is formed by voltages applied to the first electrodes PXL, the second electrodes Vcom, and the third electrode 27, respectively.

First, second, and third driving voltages may be applied to the first electrodes PXL, the second electrodes Vcom, and the third electrode 27, respectively.

The first, second, and third driving voltages that are applied to the barrier cell 20 may be a part of a pixel voltage and a common voltage that are applied to a display panel.

By appropriately adjusting the first, second, and third driving voltages, the barrier cell 20 may function as a parallax barrier that divides incident light of the second liquid crystal layer 26 to emit the divided light beams in different directions.

In the conventional barrier cell 20, ball spacers BS for maintaining cell gaps are randomly arranged as shown in FIG. 1.

As a result, there is a problem in which cell gaps become non-uniform due to step heights made on the deposition surfaces of the third and fourth substrates 21 and 29.

Also, as shown in FIG. 2, since the ball spacers BS are arranged regardless of black areas Br_B and white areas Br_W of the barrier cell 20, light leakage occurs due to the ball spacers BS when a 3D image is displayed.

When a 3D image is displayed, the barrier cell 20 is divided into the black areas Br_B and the white areas Br_W, wherein the black areas Br_B block light emitted from the display panel, and the white areas Br_W transmit light emitted from the display panel.

Accordingly, when a 3D image is displayed, the black areas Br_B need to completely block light. However, in the conventional barrier cell 20, since the ball spacers BS are arranged in areas corresponding to the black areas Br_B, light leakage occurs.

In other words, liquid crystal surrounds the ball spacers BS, and light emitted from the display panel is blocked or transmitted according to the alignment of the liquid crystal. If the anchoring force of an alignment film is weakened due to physical force during a rubbing process, light leakage may occur in black areas Br_B due to changes, etc. of the liquid crystal molecules around the ball spacers BS.

SUMMARY OF THE INVENTION

Accordingly, the present invention is directed to an image display device that substantially obviates one or more of the problems due to limitations and disadvantages of the related art.

An object of the present disclosure is to provide an image display device capable of preventing light leakage due to spacers by adjusting the arrangement of the spacers in a barrier cell.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, there is provided a display device including: a display panel configured to display an image; and a barrier cell configured to block or transmit an image emitted from the display panel, wherein a pattern spacer for maintaining a cell gap of the barrier cell is disposed in correspondence to a white area of the barrier cell, and the white area transmits the image emitted from the display panel.

In another aspect, there is provided a method of fabricating an image display device, including: forming a display panel that displays a 2-dimensional (2D) image or a 3-dimensional image (3D) image; and forming a barrier cell that blocks or transmits an image emitted from the display panel, wherein a pattern spacer for maintaining a cell gap of the barrier cell is disposed in correspondence to a white area of the barrier cell, and the white area transmits the image emitted from the display panel.

As described above, in the image display device including the barrier cell, according to the present embodiment, by adjusting the arrangement of spacers in the barrier cell such that the spacers are arranged in correspondence to the white areas (transmission areas) of the barrier cell, light leakage due to the spacers may be reduced.

As a result, it is possible to reduce 3D crosstalk, thereby improving the quality of 3D images.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments, examples of which are illustrated in the accompanying drawings.

Figure 3:
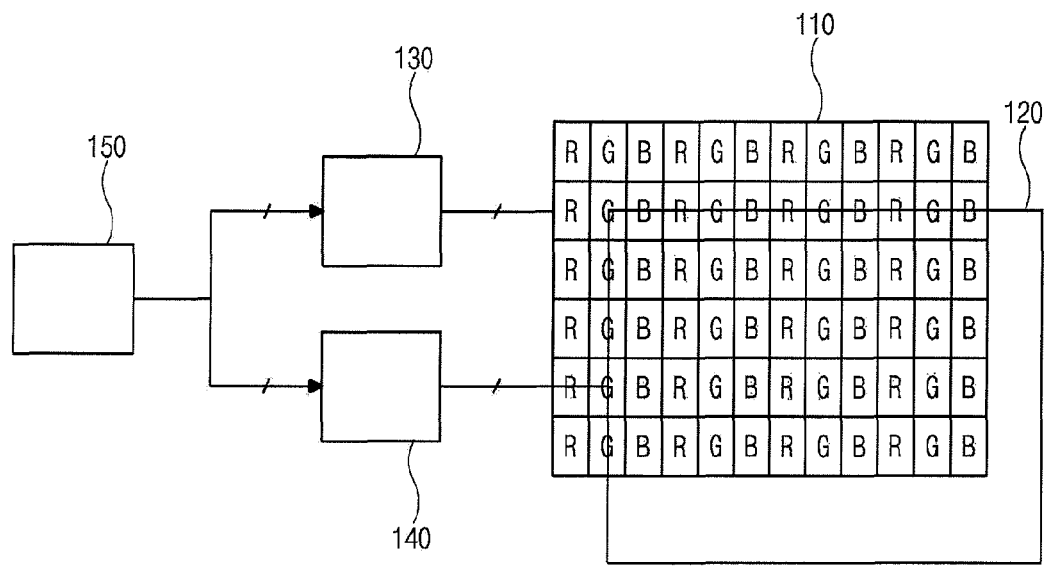
FIG. 3 is a view schematically illustrating an image display device according to an embodiment of the present invention.
Figure 4:
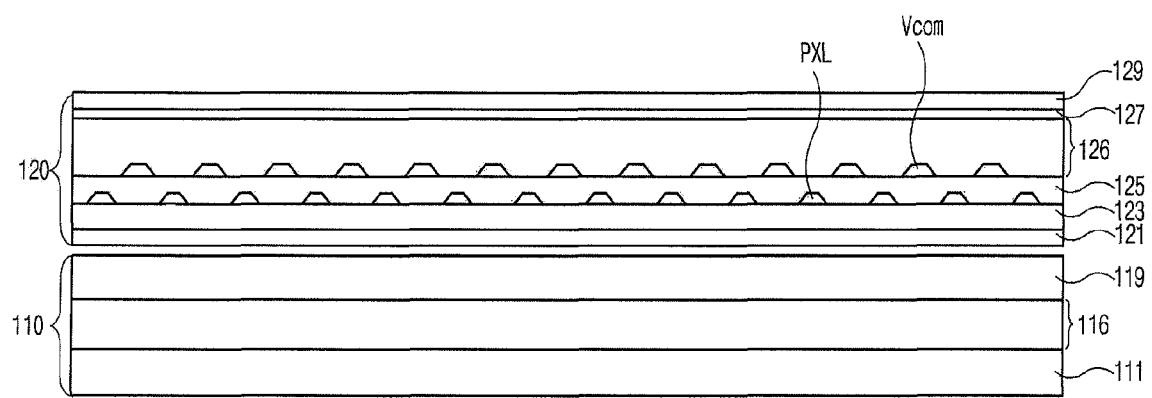
FIG. 4 shows a display panel and a barrier cell in the image display device according to the embodiment of the present invention.
Figure 5:
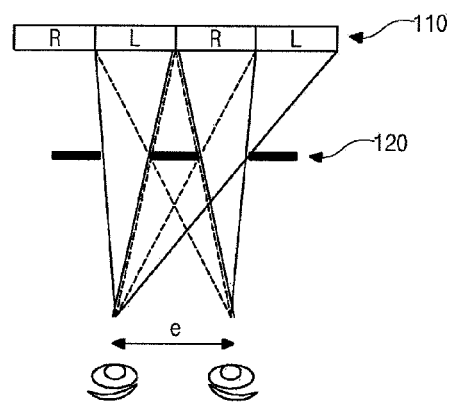
FIG. 5 is a view for explaining a 3-dimensional (3D) image mode in the image display device according to the embodiment of the present invention.

FIG. 3 is a view schematically illustrating an image display device 100 according to an embodiment of the present invention, FIG. 4 shows a display panel 110 and a barrier cell 120 in the image display device 100 according to the embodiment of the present invention, and FIG. 5 is a view for explaining a 3-dimensional (3D) image mode in the image display device 100 according to the embodiment of the present invention.

As shown in FIGS. 3 and 4, the image display device 100 may include the display panel 110, the barrier cell 120, etc.

The display panel 110 may include first and second substrates 111 and 119 that are spaced apart from each other in a manner to face each other, and a first liquid crystal layer 116 formed between the first and second substrates 111 and 119.

The display panel 110 may include left-eye horizontal pixel lines (not shown) Hl that display left-eye images, and right-eye horizontal pixel lines (not shown) Hr that display right-eye images.

In each of the left-eye and right-eye horizontal pixel lines Hl and Hr, red, green, and blue sub-pixel areas (R, G, B) are sequentially arranged, and the left-eye horizontal pixel lines Hl and the right-eye horizontal pixel lines Hr may be alternately arranged in a vertical direction (row direction) of the display panel 110.

Although not shown in the drawings, on the first substrate 111, gate lines (not shown) and data lines (not shown) that intersect each other to define sub-pixel areas, and thin film transistors (not shown) connected to the gate and data lines may be formed.

Also, pixel electrodes (not shown) connected to the thin film transistors and disposed in pixel areas (not shown), etc. may be formed on the first substrate 111.

Also, a plurality of red, green, and blue color filters (not shown), a plurality of black matrices (not shown), etc. are formed on the second substrate 119.

In the display panel 110, an electric field is formed by a data voltage applied to the pixel electrodes, so that alignment of the liquid crystal molecules of the first liquid crystal layer 116 changes to adjust light transmission, thereby displaying an image.

The barrier cell 120 may include third and fourth substrates 121 and 129, and a second liquid crystal layer 126 formed between the third and fourth substrates 121 and 129.

A first protection layer 123 is formed on the third substrate 121, and a plurality of first electrodes PXL are formed at intervals on the first protection layer 123. A second protection layer 125 is formed on the first electrodes PXL, and a plurality of second electrodes Vcom are formed at intervals on the second protection layer 125.

Each first electrode PXL is formed in correspondence to the space between two neighboring second electrodes Vcom, and each second electrode Vcom is formed in correspondence to the space between two neighboring first electrodes PXL.

In other words, the first electrodes PXL and the second electrodes Vcom may be alternately arranged.

However, the plurality of first electrodes PXL and the plurality of second electrodes Vcom may be arranged at intervals on the same layer (that is, on the third substrate 121). In this case, likewise, the first electrodes PXL and the second electrodes Vcom may be alternately arranged.

A third electrode 127 is formed in the form of a film on the lower surface of the fourth substrate 129, and a second liquid crystal layer 126 is formed between the third substrate 121 and the fourth substrate 129.

The liquid crystal molecules of the second liquid crystal layer 126 may be aligned depending on an electric field that is formed by voltages applied to the first electrodes PXL, the second electrodes Vcom, and the third electrode 127, respectively.

First, second, and third driving voltages may be applied to the first electrodes PXL, the second electrodes Vcom, and the third electrode 127, respectively.

The first, second, and third driving voltages applied to the barrier cell 120 may be a part of a pixel voltage and a common voltage that are applied to the display panel 110.

By appropriately adjusting the first, second, and third driving voltages, the barrier cell 120 may function as a parallax barrier that divides incident light of the second liquid crystal layer 126 to emit the divided light beams in different directions.

Figure 1:
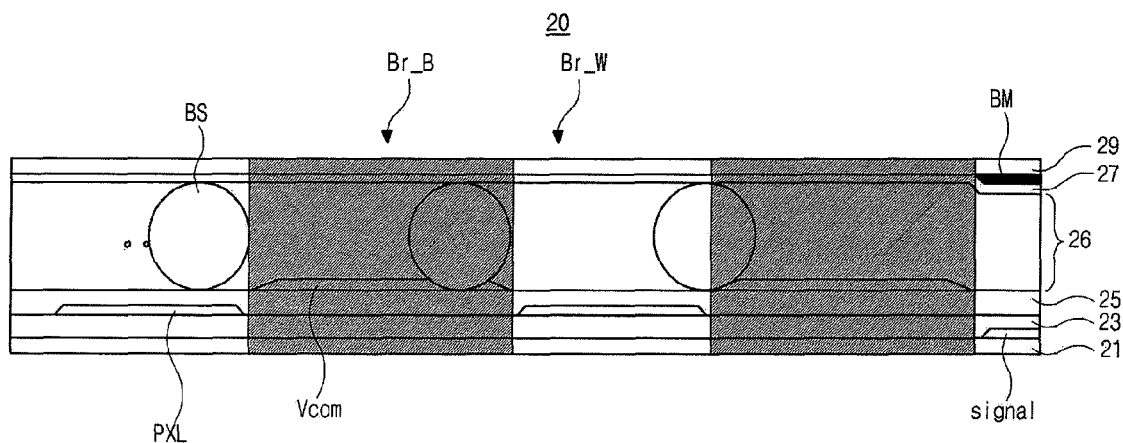
FIGS. 1 and 2 are views for explaining the arrangement of spacers in a conventional barrier cell.
Figure 2:
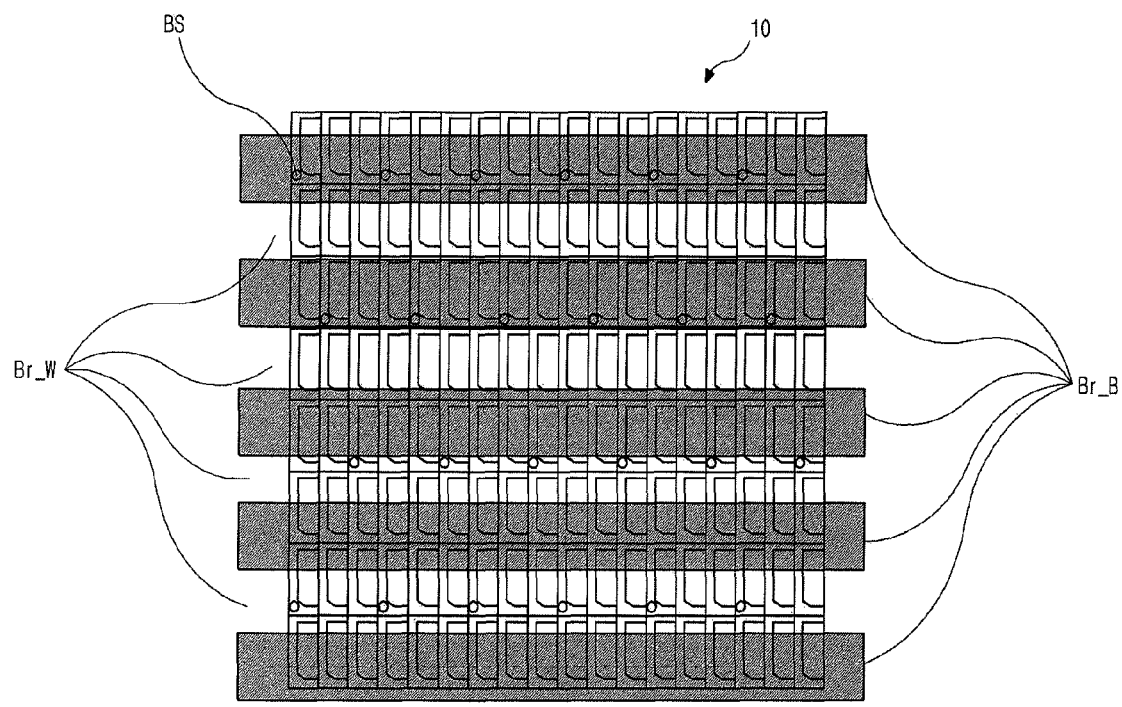

For example, areas corresponding to the first electrodes PXL may become white areas (Br_W of FIG. 1) that transmit light without changing the alignment of liquid crystal molecules, areas corresponding to the second electrodes Vcom may become black areas (Br_B of FIG. 1) that block light by changing the alignment of liquid crystal molecules.

The display panel driver 130 generates a gate control signal and a data signal using an image signal RGB, a vertical synchronization signal Vsync, a horizontal synchronization signal Hsync, a data enable signal DE, a clock signal CLK, etc., and transfers the gate control signal and the data signal to the display panel 110.

The display panel driver 130 may be mounted on a printed circuit board (PCB).

A barrier driver 140 generates a barrier driving signal using an interface signal, and transfers the barrier driving signal to the barrier cell 120.

The interface signal is a signal that is used for data transfer in a serial interface protocol, such as I2C, and I2C is configured with a clock signal SCL and a data signal SDA.

The barrier driver 140 is configured in the form of an integrated circuit (IC), and mounted on a PCB.

A system unit 150 transfers the image signal RGB, the vertical synchronization signal Vsync, the horizontal synchronization signal Hsync, the data enable signal DE, and the clock signal CLK to the display panel driver 130, and also generates the interface signal to transfer it to the barrier driver 140. The system unit 150 may be a TV system or a graphic card.

The image display device 100 may control the display panel 110 and the barrier cell 120 to operate in a 2D image mode or a 3D image mode.

For example, in the 2D image mode, the display panel 110 displays a 2D image, and the barrier cell 120 transmits the 2D image, so that the image display device 100 displays the 2D image.

In detail, in the 2D image mode, the first, second, and third driving voltages that are respectively applied to the first electrodes PXL, the second electrodes Vcom, and the third electrode 127 of the barrier cell 120 have no substantial voltage difference.

For example, in the 2D image mode, the first, second, and third driving voltage may be the same voltage.

As a result, since no electric field is formed in the barrier cell 120, alignment of the liquid crystal molecules in the second liquid crystal layer 126 does not change.

Accordingly, an image emitted from the display panel 110 is transmitted through the barrier cell 120 so that a user can recognize the 2D image.

Meanwhile, in the 3D image mode, the image display device 100 implements a 3D image using binocular disparity.

In order to implement a 3D image using binocular disparity, a left-eye image L and a right-eye image R emitted from the display panel 110 need to be separately transferred to a viewer's left eye and right eye, respectively.

Accordingly, in the 3D image mode, images emitted from the display panel 110 are blocked or transmitted by the barrier cell 120 to separate left-eye images from right-eye images.

In other words, the image display device 100 including the barrier cell 120 blocks or transmits a part of images emitted from the display panel 110 through the barrier cell 120 to separate left-eye images L from right-eye images R, and transfers the left-eye images L and the right-eye images R to different viewing zones, respectively.

That is, as shown in FIG. 5, right-eye images R emitted toward a viewer's left eye, and left-eye images L emitted toward the viewer's right eye are blocked by the black areas of the barrier cell 120.

Also, left-eye images L emitted toward the viewer's left eye, and right-eye images R emitted toward the viewer's right eye are transmitted through the white areas of the barrier cell 120.

In this way, images output from the display panel 110 are blocked or transmitted by the barrier cell 120 so that left-eye images L are transferred to the viewer's left eye, and right-eye images R are transferred to the viewer's right eye.

In detail, in the 3D image mode, there may be a voltage difference between the first, second, and third driving voltages that are respectively applied to the first electrodes PXL, the second electrodes Vcom, and the third driving voltage.

For example, since the first driving voltage applied to the first electrodes PXL is the same as the third driving voltage applied to the third electrode 127, there is no substantial voltage difference between the first electrodes PXL and the third electrode 127, so that alignment of liquid crystal molecules corresponding to the first electrodes PXL does not change.

Meanwhile, since the second driving voltage applied to the second electrodes Vcom is different from the third driving voltage applied to the third electrode 127, there is a voltage difference between the second electrodes Vcom and the third electrode 127 so that alignment of liquid crystal molecules corresponding to the first electrodes PXL changes.

As a result, in the barrier cell 120, black areas that block light and white areas that transmit light are alternately arranged.

Accordingly, the barrier cell 120 blocks a part of an image in the black areas to separate a left-eye image from a right-eye image, and transfers the left-eye image and the right-eye image to different viewing zones, respectively, through the white areas.

The viewer recognizes the left-eye image and the right-eye image of the viewer's left and right eyes as a 3D image by binocular disparity.

Figure 6:
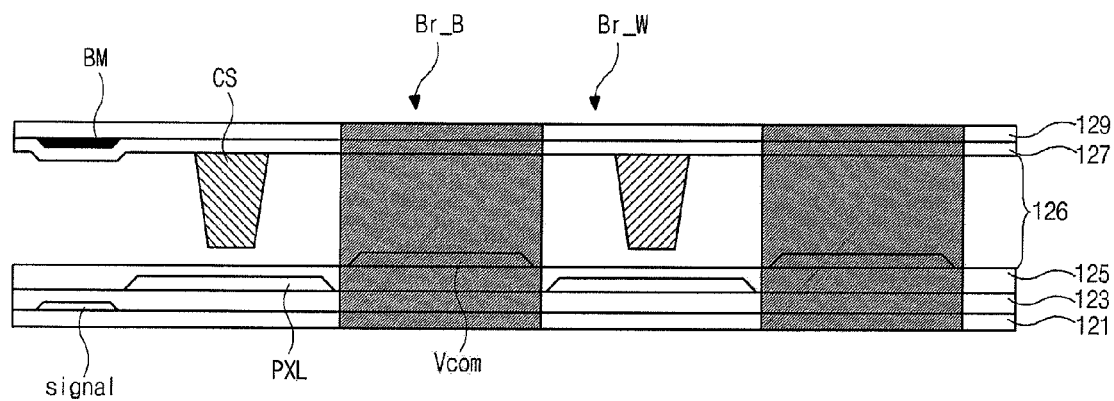
FIGS. 6 and 7 are views for explaining the arrangement of spacers in a barrier cell according to an embodiment of the present invention.
Figure 7:
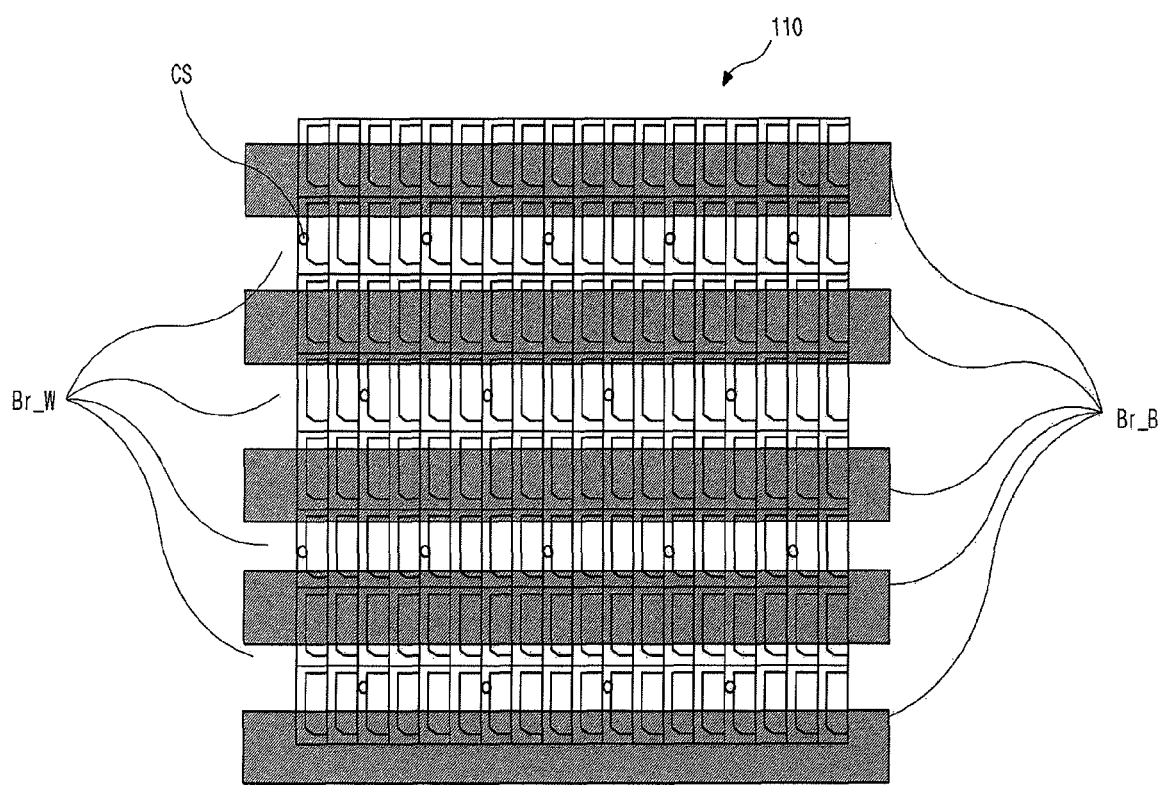

FIGS. 6 and 7 are views for explaining the arrangement of spacers in the barrier cell 120 according to the embodiment of the present invention.

As shown in FIG. 6, the barrier cell 120 may include the third substrate 121, the fourth substrate 129, and the second liquid crystal layer 126 formed between the third substrate 121 and the fourth substrate 129.

The first protection layer 123 is formed on the third substrate 121, and the plurality of first electrodes PXL are formed at intervals on the first protection layer 123. The second protection layer 125 is formed on the first electrodes PXL, and the plurality of second electrodes Vcom are formed at intervals on the second protection layer 125.

Signal lines are formed between the third substrate 121 and the first protection layer 123, and the black matrices BM may be formed between the fourth substrate 129 and the third electrode 127 to cover the signal lines, etc.

Also, in the barrier cell 120, a plurality of pattern spacers CS are formed to maintain cell gaps.

In a conventional barrier cell, since ball spacers BS for maintaining cell gaps are arranged regardless of the black areas Br_B and white areas Br_W of the barrier cell, light leakage occurs due to the ball spacers BS when a 3D image is implemented.

However, in the barrier cell 120 according to the present embodiment, as shown in FIGS. 6 and 7, the pattern spacers CS may be arranged in the white areas Br_W that transmit light, in correspondence to the first electrodes PXL.

That is, in the barrier cell 120, since the pattern spacers CS are arranged in correspondence to the white areas Br_W while no pattern spacer CS is arranged in correspondence to the black areas Br_B, light leakage that is caused by the pattern spacers CS in the black areas Br_B may be reduced.

As a result, since the barrier cell 120 can prevent light leakage due to the pattern spacers CS, it is possible to reduce 3D crosstalk, thereby improving the quality of 3D images.

FIGS. 8A to 8E are views for explaining a process of fabricating the third substrate 121 of the barrier cell 120 according to the embodiment of the present invention.

Figure 8A:
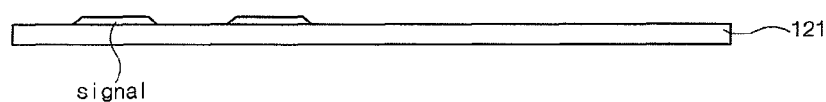
FIGS. 8A to 8E are views for explaining a process of fabricating a third substrate of the barrier cell according to the embodiment of the present invention.

First, as shown in FIG. 8A, first and second signal lines that supply a driving voltage for driving the barrier cell 120 may be formed on the third substrate 121 which is a transparent substrate, by a first mask process.

The first and second signal lines may be formed on the edge portion of the barrier cell 120. The first and second signal lines may be made of molybdenum (Mo), and formed with a thickness of 3000 Å.

Figure 8B:
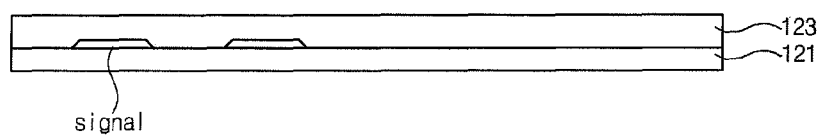

Then, as shown in FIG. 8B, the first protection layer 123 may be formed on the first and second signal lines to isolate the first and second signal lines from the first electrodes PXL.

Figure 8C:
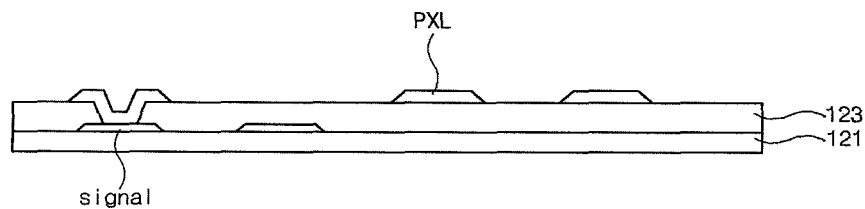

Next, as shown in FIG. 8C, the first electrodes PXL may be formed on the first protection layer 123 by a second mask process.

At this time, the first electrodes PXL may be connected to the first signal line for supplying a first driving voltage, through a first contact hole.

Figure 8D:
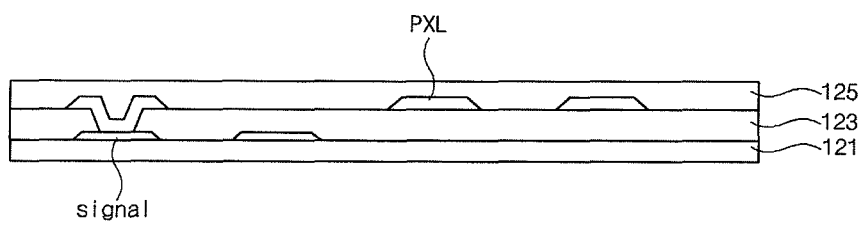

Then, as shown in FIG. 8D, the second protection layer 125 may be formed on the first electrodes PXL to isolate the first electrodes PXL from the second electrodes Vcom.

The second electrodes Vcom may be formed on the same layer (that is, on the first protection layer 123) as the first electrodes PXL, without forming the second protection layer 125, such that the first electrodes PXL and the second electrodes Vcom are arranged to be spaced part from each other. In this case, the first electrodes PXL and the second electrodes Vcom may be alternately formed.

Figure 8E:
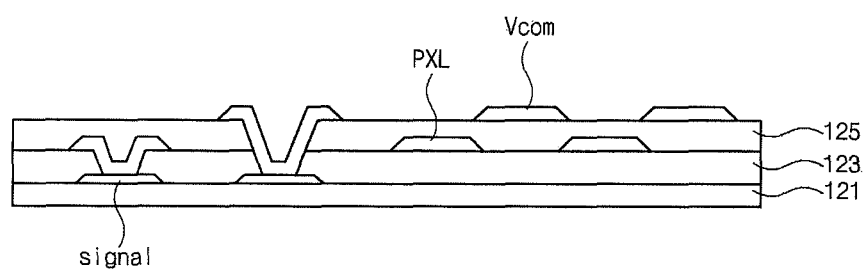

Then, as shown in FIG. 8E, the second electrodes Vcom may be formed on the second protection layer 125 by a third mask process.

The second electrodes Vcom may be connected to the second signal line for supplying a second driving voltage, through a second contact hole.

Figure 9A:
FIGS. 9A to 9C are views for explaining a process of fabricating a fourth substrate of the barrier cell according to the embodiment of the present invention.
Figure 9B:
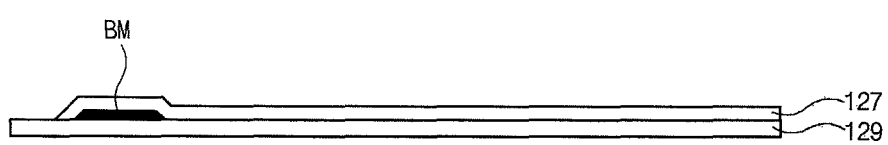
Figure 9C:
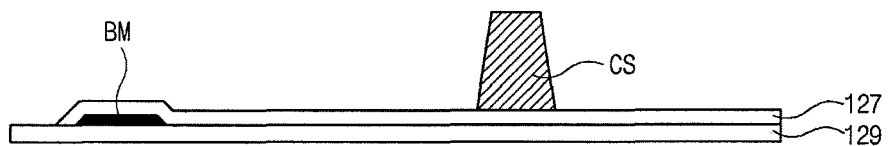

FIGS. 9A to 9C are views for explaining a process of fabricating the fourth substrate 129 of the barrier cell 120 according to the embodiment of the present invention.

As shown in FIG. 9A, a black matrix BM may be formed on the fourth substrate 129 which is a transparent substrate, in correspondence to a signal line, by a fourth mask process.

Then, as shown in FIG. 9B, the third electrode 127 may be formed on the black matrix BM.

The third electrode 127 may be made of Indium Tin Oxide (ITO), and formed in the form of a film.

Next, as shown in FIG. 9C, the pattern spacers CS may be formed by a fifth mask process.

Each pattern spacer CS may be in the shape of a trapezoid, and formed with a height of 3.9 um.

At this time, by appropriately adjusting the fifth mask, the pattern spacers CS may be preferably formed in correspondence to the first electrodes PXL in the third substrate 121 of the barrier cell 120.

As a result, in the barrier cell 120, the pattern spacers CS may be arranged in the white areas Br_W that transmit light, in correspondence to the first electrodes PXL.

That is, in the barrier cell 120, since the pattern spacers CS are arranged in correspondence to the white areas Br_W while no pattern spacer CS is arranged in correspondence to the black areas Br_B, it is possible to reduce light leakage that may be caused by the pattern spacers CS in the black areas Br_B.

Accordingly, in the barrier cell 120, it is possible to prevent light leakage due to pattern spacers CS and reduce 3D crosstalk, thereby improving the image quality of 3D images.

It will be apparent to those skilled in the art that various modifications and variations can be made in a display device of the present disclosure without departing from the spirit or scope of the invention. Thus, it is intended that the present invention covers the modifications and variations of this invention provided they come within the scope of the appended claims and their equivalents.

What is claimed is:

1. An image display device, comprising:
   a display panel configured to display an image; and
   a barrier cell including a white area and a black area and configured to block or transmit an image emitted from the display panel,
   wherein a pattern spacer for maintaining a cell gap of the barrier cell is disposed in correspondence to the white area except the black area, and the white area transmits the image emitted from the display panel,
   wherein a cell gap in the white area is substantially equal to a cell gap in the black area, and a thickness of the pattern spacer is substantially equal to the cell gap in the white area,
   wherein the barrier cell includes:
   a third substrate and a fourth substrate spaced apart from each other and facing each other;
   a second liquid crystal layer between the third substrate and the fourth substrate;
   first and second signal lines on the third substrate;
   a first protection layer on the first and second signal lines;
   a plurality of first electrodes on the first protection layer and connected to the first signal line;
   a second protection layer on the plurality of first electrodes;

a plurality of second electrodes on the second protection layer and connected to the second signal line,
wherein the plurality of first electrodes and the plurality of second electrodes are alternately arranged at intervals on opposite sides of the second protection layer;
a black matrix on the fourth substrate and corresponding to the first and second signal lines; and
a third electrode on the fourth substrate,
wherein the first protection layer is disposed between the first and second signal lines and the plurality of first and second electrodes, and extends throughout the white area and the black area,
wherein the first protection layer directly contacts the first and second signal lines and the plurality of first electrodes, and
wherein the pattern spacer is disposed between the third electrode and the second protection layer, an end of the pattern spacer contacts the third electrode, and an opposite end of the pattern spacer terminates within the second liquid crystal layer and does not contact the second protection layer.

2. The image display device of claim 1, wherein the white area corresponds to the plurality of first electrodes.

3. The image display device of claim 1, wherein the pattern spacer is in a shape of a trapezoid.

4. The image display device of claim 1, wherein each of the plurality of second electrodes corresponds to a space between two neighboring first electrodes.

5. The image display device of claim 1, wherein the display panel includes left-eye horizontal pixel lines and right-eye horizontal pixel lines, and the left-eye horizontal pixel lines and the right-eye horizontal pixel lines are alternately arranged in a vertical direction of the display panel.

6. A method of fabricating an image display device, comprising:
forming a display panel that displays a 2-dimensional (2D) image or a 3-dimensional image (3D) image; and
forming a barrier cell that blocks or transmits an image emitted from the display panel and includes a white area and a black area,
wherein a pattern spacer for maintaining a cell gap of the barrier cell is disposed in correspondence to the white area except the black area, and the white area transmits the image emitted from the display panel,
wherein a cell gap in the white area is substantially equal to a cell gap in the black area, and a thickness of the pattern spacer is substantially equal to the cell gap in the white area, and
wherein the step of forming the barrier cell includes:
forming first and second signal lines on a third substrate;
forming a first protection layer on the first and second signal lines;
forming a plurality of first electrodes on the first protection layer and connected to the first signal line;
forming a second protection layer on the plurality of first electrodes;
forming a plurality of second electrodes on or over the second protection layer and connected to the second signal line,
wherein the plurality of first electrodes and the plurality of second electrodes are alternately arranged at intervals on opposite sides of the second protection layer;
forming a black matrix on a fourth substrate and corresponding to the first and second signal lines;
forming a third electrode on the fourth substrate;
forming the pattern spacer on the third electrode; and
attaching the third and fourth substrates with a liquid crystal layer,
wherein the first protection layer is disposed between the first and second signal lines and the plurality of first and second electrodes, and extends throughout the white area and the black area,
wherein the first protection layer directly contacts the first and second signal lines and the plurality of first electrodes, and
wherein the pattern spacer is disposed between the third electrode and the second protection layer, an end of the pattern spacer contacts the third electrode, and an opposite end of the pattern spacer terminates within the second liquid crystal layer and does not contact the second protection layer.

7. The method of claim 6, wherein the white area corresponds to the plurality of first electrodes.

8. The method of claim 6, wherein the pattern spacer is in a shape of a trapezoid.

9. The method of claim 6, wherein each of the plurality of second electrodes corresponds to a space between two neighboring first electrodes.

* * * * *